(12) United States Patent
Nagai

(10) Patent No.: US 11,231,321 B2
(45) Date of Patent: Jan. 25, 2022

(54) WAVELENGTH SHIFT CORRECTION SYSTEM AND WAVELENGTH SHIFT CORRECTION METHOD

(71) Applicant: KONICA MINOLTA, INC., Chiyoda-ku (JP)

(72) Inventor: Yoshiroh Nagai, Nishinomiya (JP)

(73) Assignee: Konica Minolta, Inc., Tokyo (JP)

( * ) Notice: Subject to any disclaimer, the term of this patent is extended or adjusted under 35 U.S.C. 154(b) by 203 days.

(21) Appl. No.: 16/640,941

(22) PCT Filed: May 29, 2018

(86) PCT No.: PCT/JP2018/020444
§ 371 (c)(1),
(2) Date: Feb. 21, 2020

(87) PCT Pub. No.: WO2019/039024
PCT Pub. Date: Feb. 28, 2019

(65) Prior Publication Data
US 2021/0123804 A1    Apr. 29, 2021

(30) Foreign Application Priority Data
Aug. 22, 2017 (JP) .............................. JP2017-159291

(51) Int. Cl.
*G01J 3/28* (2006.01)
(52) U.S. Cl.
CPC ........... *G01J 3/28* (2013.01); *G01J 2003/283* (2013.01); *G01J 2003/2866* (2013.01)

(58) Field of Classification Search
CPC .......... G01J 3/28; G01J 3/02; G01J 2003/283; G01J 2003/2866; G01J 3/0216;
(Continued)

(56) References Cited

U.S. PATENT DOCUMENTS

| 9,188,485 B1 | 11/2015 | Kim et al. | |
| 2012/0150471 A1* | 6/2012 | Muto | G01J 3/462 702/104 |

FOREIGN PATENT DOCUMENTS

| EP | 0 692 703 | 1/1996 |
| JP | 63-295935 | 12/1988 |

(Continued)

*Primary Examiner* — Abdullahi Nur
(74) *Attorney, Agent, or Firm* — Cozen O'Connor

(57) ABSTRACT

A wavelength shift correction system and method includes a wavelength shift correction light source that emits wavelength shift correction light including a plurality of rays of wavelength shift correction emission-line light; and a spectrometer including a spectroscopic unit that receives the respective rays of dispersed spectral light obtained by dispersing incident light in accordance with wavelength with a plurality of photoelectric converters in the dispersion direction, and outputs electrical signals corresponding to the light intensities of the rays of dispersed spectral light. When the wavelength shift correction light is measured as the incident light with the spectrometer to be subjected to wavelength shift correction, a wavelength variation is determined on the basis of the respective electrical signals output from a plurality of specific photoelectric conversion elements that receive the plurality of rays of wavelength shift correction emission-line light in the plurality of photoelectric conversion elements.

20 Claims, 9 Drawing Sheets

(58) Field of Classification Search
CPC ........ G01J 3/0218; G01J 3/0264; G01J 3/027;
G01J 3/0297; G01J 3/10; G01J 3/18;
G01J 3/2803; G01J 3/36; G01J 3/0254
See application file for complete search history.

(56) References Cited

FOREIGN PATENT DOCUMENTS

| | | |
|---|---|---|
| JP | 3-148024 | 6/1991 |
| JP | 2005-43153 | 2/2005 |
| JP | 2007-10364 | 1/2007 |
| JP | 2010-237097 | 10/2010 |
| JP | 2014-98653 | 5/2014 |
| WO | WO 2017/076228 | 5/2017 |

* cited by examiner

WAVELENGTH ESTIMATION ERROR
CORRESPONDING TO Ne EMISSION LINE OF 7245nm

WAVELENGTH SHIFT CORRECTION SYSTEM AND WAVELENGTH SHIFT CORRECTION METHOD

RELATED APPLICATIONS

This is a U.S. National Phase Application under 35 USC 371 of International Application PCT/JP2018/020444 filed on May 29, 2018.

This application claims the priority of Japanese application no. 2017-159291 filed Aug. 22, 2017, the entire content of which is hereby incorporated by reference.

TECHNICAL FIELD

The present invention relates to a wavelength shift correction system and a wavelength shift correction method for correcting wavelength shifts of a spectrometer.

BACKGROUND ART

A spectrometer measures the spectrum of the light to be measured. Therefore, when a spectrometer is used, it is important to correct wavelength shifts caused by an age-related change or the like, for example. A technique relating to this wavelength shift correction is disclosed in Patent Literature 1, for example.

A wavelength shift correction system disclosed in Patent Literature 1 includes: a wavelength shift correction light source that outputs an emission line of a known emission-line wavelength; a spectral luminance meter to be subjected to wavelength shift correction that includes a light receiving unit formed with aligned photoelectric conversion elements that receive light dispersed in accordance with the wavelength of incident light and output electrical signals corresponding to the light intensities of the respective received wavelength components, and measures an emission line output of the wavelength shift correction light source; and a wavelength shift correcting unit that estimates the wavelength of the emission line output from a relative output of the light receiving unit at the emission-line wavelength, estimates a wavelength variation from the difference between the estimated wavelength of the emission line output and the known emission-line wavelength, and performs wavelength shift correction on the spectral luminance meter to be subjected to wavelength shift correction, in a case where the spectral luminance meter to be subjected to wavelength shift correction measures an emission line output of the wavelength shift correction light source.

In a case where the spectral luminance meter to be subjected to wavelength shift correction measures an emission line output of the wavelength shift correction light source, the wavelength shift correction system disclosed in Patent Literature 1 estimates the wavelength of the emission line output from a relative output of the light receiving unit at the emission-line wavelength, estimates a wavelength variation from the difference between the estimated wavelength of the emission line output and the known emission-line wavelength, and then performs wavelength shift correction on the spectral luminance meter to be subjected to wavelength shift correction. In view of this, the emission lines to be used for wavelength shift correction need to be independent in terms of wavelength, and therefore, it is difficult for the wavelength shift correction system disclosed in Patent Literature 1 to use a light source with narrow emission line intervals as the wavelength shift correction light source. If such a light source with narrow emission line intervals is used as the wavelength shift correction light source, it is necessary to prepare a bandpass filter for extracting a ray of emission-line light from a plurality of rays of emission line light having narrow emission line intervals, which leads to an increase in cost.

CITATION LIST

Patent Literature

Patent Literature 1: JP 2005-43153 A

SUMMARY OF INVENTION

The present invention has been made in view of the above circumstances, and an object thereof is to provide a wavelength shift correction system that is hardly affected by emission line intervals, and a wavelength shift correction method.

To achieve (at least one of) the above object(s), a wavelength shift correction system and a wavelength shift correction method reflecting one aspect of the present invention includes: a wavelength shift correction light source that emits wavelength shift correction light including a plurality of rays of wavelength shift correction emission-line light; and a spectrometer including a spectroscopic unit that receives the respective rays of dispersed spectral light obtained by dispersing incident light in accordance with wavelength with a plurality of photoelectric conversion elements arranged in the direction of dispersion, and outputs the respective electrical signals corresponding to the respective light intensities of the respective rays of dispersed spectral light, the spectrometer being a spectrometer to be subjected to wavelength shift correction. When the wavelength shift correction light is measured as the incident light with the spectrometer to be subjected to wavelength shift correction, a wavelength variation is determined on the basis of the respective electrical signals output from a plurality of specific photoelectric conversion elements that receive the plurality of rays of wavelength shift correction emission-line light in the plurality of photoelectric conversion elements. Here, at least one of the plurality of specific photoelectric conversion elements receives a plurality of rays of the plurality of rays of wavelength shift correction emission-line light.

The advantages and features afforded by one or more embodiments of the invention will be more fully understood from the detailed description and accompanying drawings provided below. The detailed description and the accompanying drawings are given by way of example only, and are not intended as a definition of limitations of the invention.

DESCRIPTION OF EMBODIMENTS

Figure 1A:
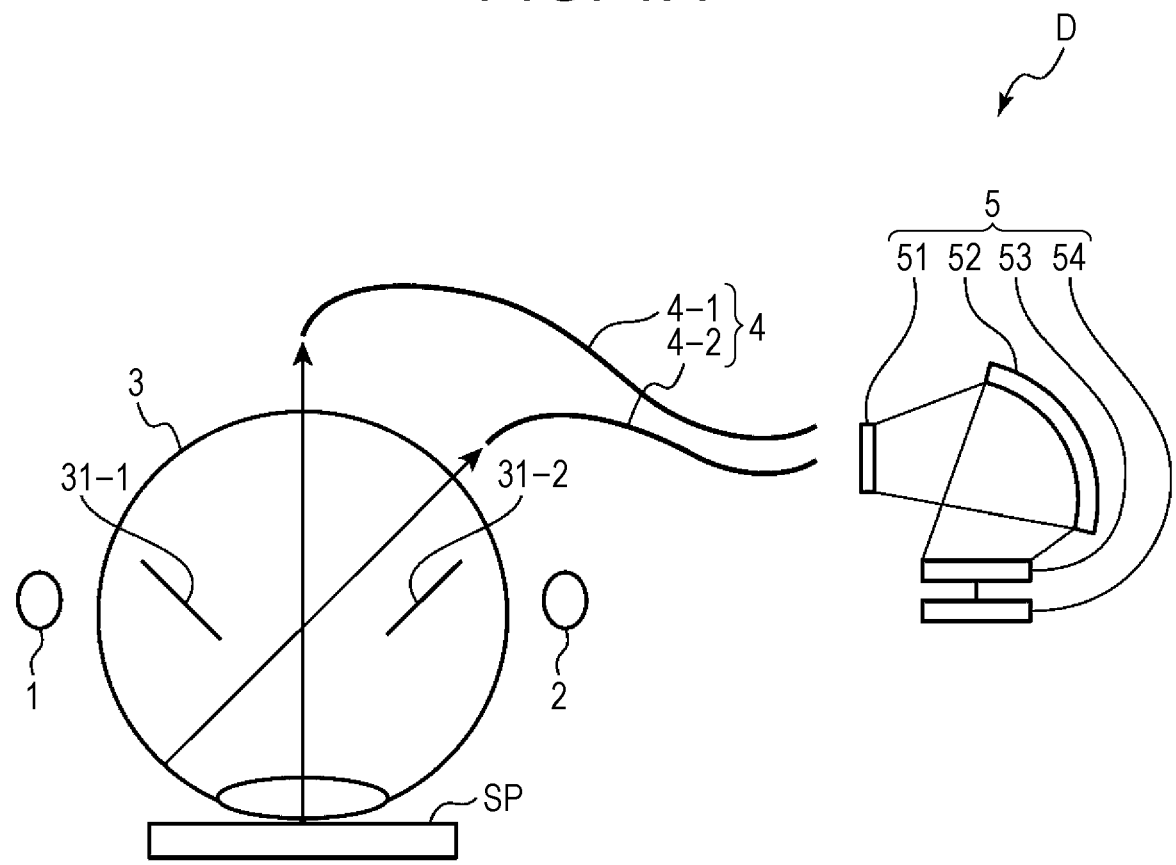
FIG. 1 is a schematic configuration diagram showing the optical configuration of a spectrometer incorporating a wavelength shift correction system according to an embodiment.

The following is a description of one or more embodiments of the present invention, with reference to the drawings. However, the scope of the invention is not limited to the disclosed embodiment(s). It should be noted that components denoted by like reference numerals in the respective drawings are like components, and explanation thereof will not be skipped where appropriate. In this specification, like components are generically denoted by a reference numeral without any suffix, and individual components are denoted by reference numerals accompanied by suffixes.

A wavelength shift correction system in the embodiment is a system that performs wavelength shift correction on a spectrometer after using the spectrometer that has been subjected to wavelength shift correction at the factory or the like before shipment, for example. Such a wavelength shift correction system includes: a wavelength shift correction light source that emits wavelength shift correction light including a plurality of rays of wavelength shift correction emission-line light; a spectrometer including a spectroscopic unit that receives respective rays of dispersed spectral light obtained by dispersing incident light in accordance with wavelength with a plurality of photoelectric conversion elements arranged in the direction of dispersion, and outputs the respective electrical signals corresponding to the respective light intensities of the respective rays of dispersed spectral light, the spectrometer being a spectrometer to be subjected to wavelength shift correction; and a wavelength shift correcting unit that determines a wavelength shift correction time emission-line wavelength corresponding to reference wavelength shift correction emission-line light on the basis of respective electrical signals output from a plurality of specific photoelectric conversion elements that receive the plurality of rays of wavelength shift correction emission-line light in the plurality of photoelectric conversion elements when the wavelength shift correction light is measured as the incident light with the spectrometer to be subjected to wavelength shift correction, and determines a wavelength variation from a difference between the determined wavelength shift correction time emission-line wavelength and the known emission-line wavelength of the reference wavelength shift correction emission-line light, the reference wavelength shift correction emission-line light being set beforehand from the plurality of rays of wavelength shift correction emission-line light. In the wavelength shift correction system in the embodiment, at least one of the plurality of specific photoelectric conversion elements receives a plurality of rays of the plurality of rays of wavelength shift correction emission-line light. In such a wavelength shift correction system, the wavelength shift correction light source may be independent of or be integrated with the spectrometer as the spectrometer to be subjected to wavelength shift correction. In the description below, a case where the wavelength shift correction light source is incorporated in the spectrometer as the spectrometer to be subjected to wavelength shift correction, and is integrated with the spectrometer will be explained first, followed by an explanation of a case where the wavelength shift correction light source is independent of the spectrometer. Further, in the description below, an embodiment in which the spectrometer includes the wavelength shift correcting unit will be explained. In other words, in the embodiment described below, a wavelength shift correction system is incorporated in a spectrometer as a spectrometer to be subjected to wavelength shift correction, for example.

Figure 1B:
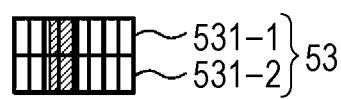
Figure 2:
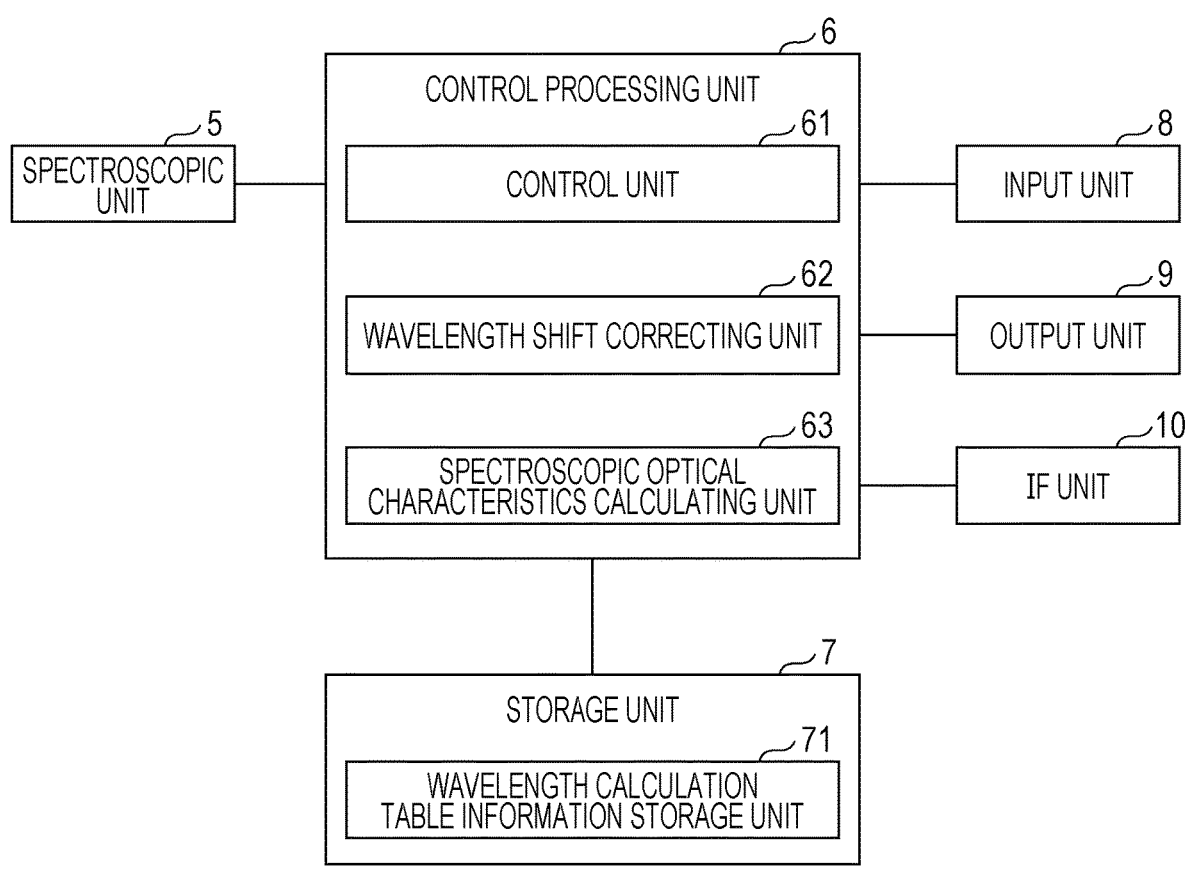
FIG. 2 is a block diagram showing the electrical configuration of the spectrometer.
Figure 3A:
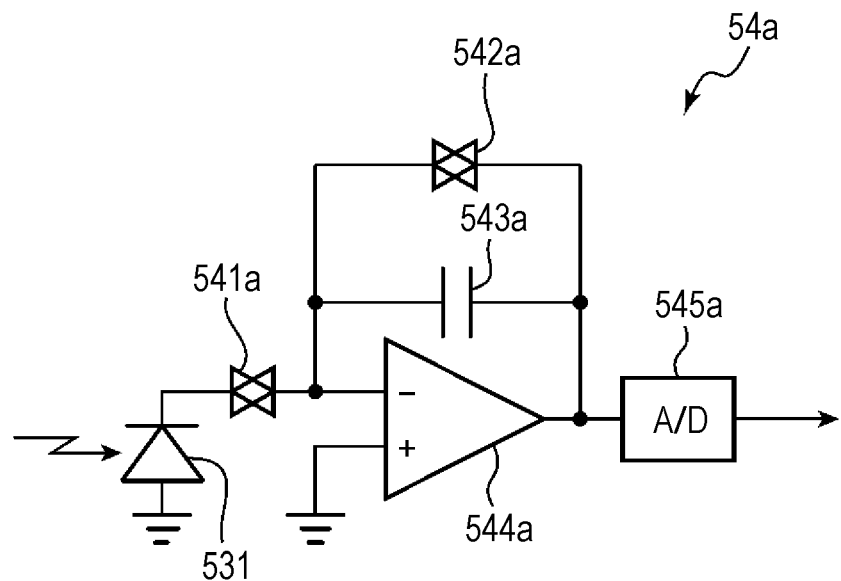
FIG. 3 is a circuit diagram showing the configuration of a preprocessing unit in the spectrometer.
Figure 3B:
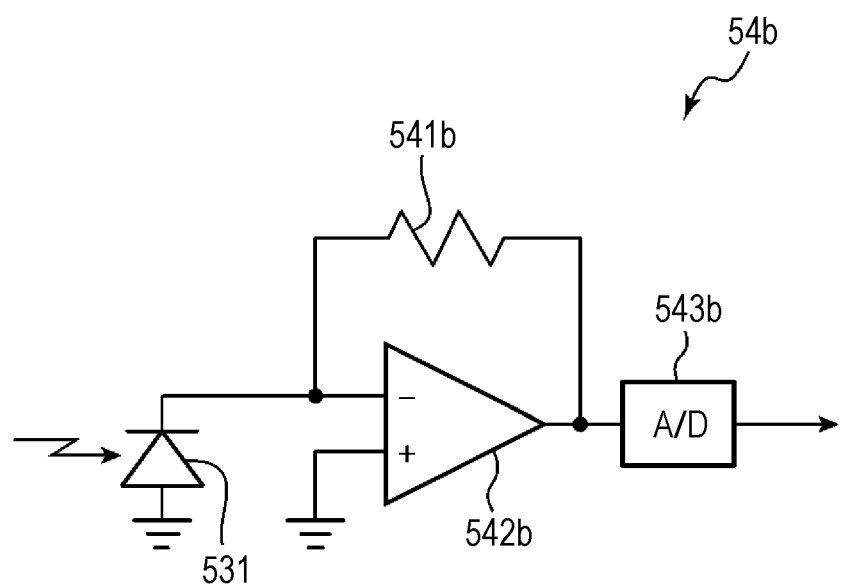

FIG. 1 is a schematic configuration diagram showing the optical configuration of a spectrometer incorporating a wavelength shift correction system according to an embodiment. FIG. 1A is a schematic diagram of the optical configuration of the spectrometer as viewed from a side. FIG. 1B is a schematic diagram of the light receiving unit of the spectrometer as viewed from above. FIG. 2 is a block diagram showing the electrical configuration of the spectrometer. FIG. 3 is a circuit diagram showing the configuration of a preprocessing unit in the spectrometer. FIG. 3A shows the preprocessing unit of a first mode. FIG. 3B shows the preprocessing unit of a second mode.

A spectrometer D according to the embodiment includes a wavelength shift correction system that performs wavelength shift correction at the stage of use, and is the spectrometer to be subjected to wavelength shift correction performed by the wavelength shift correction system. As shown in FIGS. 1 and 2, for example, the spectrometer D includes a wavelength shift correction light source 1, a measurement light source 2, an integrating sphere 3, a light guide member 4, a spectroscopic unit 5, a control processing unit 6, a storage unit 7, an input unit 8, an output unit 9, an interface unit (IF unit) 10, and a housing (not shown). The housing (not shown) is a box-like housing that houses the wavelength shift correction light source 1, the measurement light source 2, the integrating sphere 3, the light guide member 4, the spectroscopic unit 5, the control processing unit 6, the storage unit 7, the input unit 8, the output unit 9, and the IF unit 10.

The wavelength shift correction light source 1 is connected to the control processing unit 6, and is used for wavelength shift correction under the control of the control processing unit 6. The wavelength shift correction light source 1 includes a first light source and a first light emission circuit (a first drive circuit) that drives and causes the first light source to emit light, for example. Any light source can be used as the wavelength shift correction light source 1, as long as the light source emits emission-line light. In this embodiment, the first light source to be used as the wavelength shift correction light source 1 may emit a plurality of rays of emission-line light with wide wavelength intervals, such as a Hg lamp having the spectrum shown in FIG. 5B described later, for example, but does not necessarily emit a plurality of rays of emission-line light with wide wavelength intervals. The first light source to be used as the wavelength shift correction light source 1 may be a light source that emits a plurality of rays of emission-line light with narrow emission line intervals so that a single photoelectric conversion element at the later described light receiving unit 53 in the spectroscopic unit 5 will receive the plurality of emission-line light. In this embodiment, the wavelength shift correction light source 1 includes a light source that emits a plurality of rays of emission-line light with narrow emission line intervals, such as a neon lamp (a Ne lamp) having the spectrum shown in FIG. 5A described later, for example. More specifically, in this embodiment, the neon lamp that is inexpensive as a light source, is small in size, and has an easily configurable light emission circuit (a drive circuit) is used as the wavelength shift correction light source 1. The wavelength shift correction light source 1 is disposed at the integrating sphere 3 so that the light emitting surface for emitting wavelength shift correction light faces the inside of the integrating sphere 3, and wavelength shift correction light emitted from the wavelength shift correction light source 1 is emitted into the integrating sphere 3.

The measurement light source 2 is a device that is connected to the control processing unit 6, emits white measurement light, and is used for measurement under the control of the control processing unit 6. The measurement light source 2 includes a second light source that emits white light, and a second light emission circuit (a second drive circuit) that drives and causes the second light source to emit light, for example. A xenon lamp or the like is used as the measurement light source 2, for example. The measurement light source 2 is disposed at the integrating sphere 3 so that the light emitting surface for emitting measurement light faces the inside of the integrating sphere 3, and measurement light emitted from the measurement light source 2 is emitted into the integrating sphere 3.

The integrating sphere 3 is a member that has a diffuse reflector that diffusely reflects light, and more specifically, is a hollow sphere whose inner surface is covered with a material having a high diffuse reflectance. The material having a high diffuse reflectance may be magnesium oxide, aluminum oxide, barium sulfate, magnesium sulfate, zinc oxide, or the like, for example. A coating agent containing the material having a high diffuse reflectance is applied to the inner surface of the sphere, to form the diffuse reflector. A measurement aperture having a circular shape, for example, is formed through the integrating sphere 3. A first light receiving aperture having a circular shape, for example, is formed through a portion at a position in the normal direction of the measurement aperture plane in the measurement aperture. A second light receiving aperture having a circular shape, for example, is formed through a portion at a predetermined position. At the time of color measurement, the measurement object SP is brought to the measurement aperture, and the measurement object SP faces the measurement opening.

The light guide member 4 is a member that guides predetermined light from the integrating sphere 3 to the spectroscopic unit 5, and includes an optical fiber, for example. In this embodiment, the light guide member 4 includes a first optical fiber 4-1 that guides light reflected from the measurement object SP as one ray of the predetermined light from the integrating sphere 3 to the spectroscopic unit 5, and a second optical fiber 4-2 that guides reference light as another ray of the predetermined light from the integrating sphere 3 to the spectroscopic unit 5. One end of the first optical fiber 4-1 is connected to the first light receiving aperture of the integrating sphere 3, and the other end is connected to the spectroscopic unit 5 so that the reflected light enters the later described incident slit aperture in the spectroscopic unit 5. One end of the second optical fiber 4-2 is connected to the second light receiving aperture of the integrating sphere 3, and the other end is connected to the spectroscopic unit 5 so that the reference light enters the later described incident slit aperture in the spectroscopic unit 5.

In such a configuration, at the time of measurement, the measurement object SP is brought to the measurement aperture of the integrating sphere 3, and measurement light is emitted from the measurement light source 2 under the control of the control processing unit 6, as described above. The measurement light emitted from the measurement light source 2 is diffusely reflected by the inner surface of the integrating sphere 3, part of the diffusely reflected measurement light is guided by the second optical fiber 4-2 via the second light receiving aperture of the integrating sphere 3 and, as the reference light, is made to enter the spectroscopic unit 5, and the other part of the diffusely reflected measurement light illuminates the measurement object SP facing the measurement aperture of the integrating sphere 3. The reflected light of the measurement light reflected by the measurement object SP is guided by the first optical fiber 4-1 via the first light receiving aperture of the integrating sphere 3, and is made to enter the spectroscopic unit 5. Here, in the integrating sphere 3, a second baffle 31-2 is provided between the measurement light source 2 facing the inside of the integrating sphere 3 and the first light receiving aperture, so that the measurement light emitted from the measurement light source 2 directly reaches (directly arrives at) neither of the first and second light receiving apertures. In wavelength shift correction, on the other hand, a white panel is brought to the measurement aperture of the integrating sphere 3, and wavelength shift correction light is emitted from the wavelength shift correction light source 1 under the control of the control processing unit 6. This wavelength shift correction light emitted from the wavelength shift correction light source 1 is diffusely reflected by the inner surface of the integrating sphere 3, part of the diffusely reflected wavelength shift correction light is guided by the first optical fiber 4-1 via the first light receiving aperture of the integrating sphere 3 and is made to enter the spectroscopic unit 5, and the other part of the diffusely reflected wavelength shift correction light is guided by the second optical fiber 4-2 via the second light receiving aperture of the integrating sphere 3 and, as the reference light, is made to enter the spectroscopic unit 5. Here, in the integrating sphere 3, a first baffle 31-1 is provided between the wavelength shift correction light source 1 facing the inside of the integrating sphere 3 and the second light receiving aperture, so that the wavelength shift correction light emitted from the wavelength shift correction light source 1 directly reaches (directly arrives at) neither of the first and second light receiving apertures. Note that, in the wavelength shift correction, the diffusely reflected wavelength shift correction light guided by one of the first and second optical fibers 4-1 and 4-2 may be used.

The spectroscopic unit 5 is a device that is connected to the control processing unit 6. Under the control of the control processing unit 6, the spectroscopic unit 5 receives, with a plurality of photoelectric conversion elements arranged in the direction of dispersion, respective rays of dispersed spectral light obtained by dispersing incident light in accordance with wavelengths, and outputs respective electrical signals corresponding to the respective light intensities of the respective rays of dispersed spectral light. More specifically, the spectroscopic unit 5 includes an incident slit panel 51, a reflective concave diffraction grating 52, a light receiving unit 53, and a preprocessing unit 54, for example.

The incident slit panel 51 is a plate-like member in which an incident slit aperture that is a through-hole is formed. The incident slit aperture has a rectangular shape (a slit-like shape) that is long in one direction and is short in the other direction orthogonal to the one direction. The incident light is made to enter the spectroscopic unit 5 through the incident slit aperture, and is made to enter the reflective concave diffraction grating 52 while maintaining a slit-like shape.

The reflective concave diffraction grating 52 is an optical element that disperses, through diffraction, the incident light entering in the slit-like shape from the incident slit aperture in accordance with the wavelength. Each ray of the spectral light dispersed in accordance with the wavelength by the reflective concave diffraction grating 52 is reflected by the reflective concave diffraction grating 52, and is made to enter the light receiving unit 53.

The light receiving unit 53 is a circuit that is connected to the control processing unit 6, includes a plurality of photoelectric conversion elements 531 that correspond to the respective rays of dispersed spectral light and are arranged in the direction of dispersion, and photoelectrically converts the respective rays of dispersed spectral light with the respective photoelectric conversion elements 531, under the control of the control processing unit 6. Each of the photoelectric conversion elements 531 in the light receiving unit 53 is connected to the preprocessing unit 54, and each output of the photoelectric conversion elements 531 in the light receiving unit 53 is input to the preprocessing unit 54. The photoelectric conversion elements 531 each includes a silicon photodiode (SPD), and the light receiving unit 53 includes an SPD linear array sensor, for example. Further, in this embodiment, the reflected light (the wavelength shift correction light) and the reference light are made to enter the spectroscopic unit 5, as described above. Therefore, to cope with the reflected light (the wavelength shift correction light) and the reference light, the light receiving unit 53 includes a first sub light receiving unit 531-1 including a plurality of photoelectric conversion elements 531 that receive the respective rays of dispersed spectral light of the reflected light (the wavelength shift correction light), and a second sub light receiving unit 531-2 including a plurality of photoelectric conversion elements 531 that receive the respective rays of dispersed spectral light of the reference light, as shown in FIG. 1B. These first and second sub light receiving units 531-1 and 531-2 are arranged in two parallel rows in a direction orthogonal to the direction of dispersion.

The preprocessing unit 54 is a circuit that is connected to the light receiving unit 53, and outputs respective electrical signals corresponding to the respective light intensities of the respective rays of dispersed spectral light, on the basis of the respective outputs of the respective photoelectric conversion elements 531 of the light receiving unit 53. The preprocessing unit 54 is connected to the control processing unit 6, and outputs the respective electrical signals corresponding to the respective light intensities of the respective rays of dispersed spectral light to the control processing unit 6. Such a preprocessing unit 54 includes a charge storage circuit 54a of the first mode provided for each of the photoelectric conversion elements 531 in the light receiving unit 53, for example. Alternatively, the preprocessing unit 54 includes an I-V conversion circuit 54b of the second mode provided for each of the photoelectric conversion elements 531 in the light receiving unit 53, for example.

As shown in FIG. 3A, the charge storage circuit 54a includes first and second switches 541a and 542a, a capacitor 543a, an operational amplifier 544a, and an analog-digital conversion circuit (an A/D conversion circuit) 545a, for example. One end of the first switch 541a is connected to one end (anode terminal) of the photoelectric conversion element 531, and the other end of the first switch 541a is connected to the inverting input terminal (−) of the operational amplifier 544a. The other end (the cathode terminal) of the photoelectric conversion element 531 is grounded. The second switch 542a and the capacitor 543a are connected in parallel between the inverting input terminal (−) and the output terminal of the operational amplifier 544a. The non-inverting input terminal (+) of the operational amplifier 544a is grounded, and the input end of the A/D conversion circuit 545a is connected to the output terminal of the operational amplifier 544a. The output end of the A/D conversion circuit 545a is connected to the control processing unit 6. In such a charge storage circuit 54a, at a time of measurement or wavelength shift correction, the first switch 541a is turned on, and the second switch 542a is turned off. As a result, the electric charge generated through photoelectric conversion by the photoelectric conversion elements 531 is stored in the capacitor 543a, an output voltage $V=(1/C)\times \int i(t)dt$ is output from the operational amplifier 544a to the A/D conversion circuit 545a, analog-to-digital signal conversion is performed by the A/D conversion circuit 545a, and the digital signal is output to the control processing unit 6. Here, C represents the capacitance of the capacitor 543a, and the integral $\int$ is integrated with the charge storage time. The output voltage V as the digital signal corresponds to an example of an electrical signal corresponding to the light intensity of dispersed spectral light. When one output is completed, the first switch 541a is turned off, and the second switch 542a is turned on, so that the electric charge stored in the capacitor 543a is discharged, and the capacitor 543a is reset. FIG. 3A shows one charge storage circuit 54a, and the charge storage circuit 54a shown in FIG. 3A is provided in each of the photoelectric conversion elements 531 in the light receiving unit 53.

On the other hand, as shown in FIG. 3B, the I-V conversion circuit 54b includes a resistance element 541b, an operational amplifier 542b, and an analog-digital conversion circuit (an A/D conversion circuit) 543ba, for example. The inverting input terminal (−) of the operational amplifier 542b is connected to one end (an anode terminal) of the photoelectric conversion element 531. The other end (the cathode terminal) of the photoelectric conversion element 531 is grounded. The resistance element 541b is connected between the inverting input terminal (−) and the output terminal of the operational amplifier 542b. The non-inverting input terminal (+) of the operational amplifier 542b is grounded, and the input end of the A/D conversion circuit 543b is connected to the output terminal of the operational amplifier 542b. The output end of the A/D conversion circuit 543b is connected to the control processing unit 6. In such an I-V conversion circuit 54b, the electric charge generated through photoelectric conversion by the photoelectric conversion element 531 flows as a current i to the resistance element 541b, and an output voltage $V=i\times R$ is output from the operational amplifier 542b to the A/D conversion circuit 543b, is converted from an analog signal into a digital signal by the A/D conversion circuit 543b, and is output to the control processing unit 6. Here, R represents the resistance value of the resistance element 541b. The output voltage V as the digital signal corresponds to another example of an electrical signal corresponding to the light intensity of dispersed spectral light. FIG. 3B shows one I-V conversion circuit 54b, and the I-V conversion circuit 54b shown in FIG. 3B is provided in each of the photoelectric conversion elements 531 in the light receiving unit 53.

The input unit 8 is a device that is connected to the control processing unit 6, and inputs, to the spectrometer D, various commands such as a command for issuing a wavelength shift correction start instruction and a command for issuing a measurement start instruction, and various kinds of data necessary for performing the wavelength shift correction and the measurement, such as the name of the measurement object. For example, the input unit 8 is formed with a plurality of input switches or the like to which predetermined functions are assigned. The output unit 9 is a device that is connected to the control processing unit 6, and, under the control of the control processing unit 6, outputs commands and data input from the input unit 8, and results of measurement or the like conducted by the spectrometer D. For example, the output unit 9 is a display device such as a CRT display, a liquid crystal display (LCD), or an organic EL display, or a printing device such as a printer.

Note that a touch panel may be formed with the input unit 8 and the output unit 9. In a case where this touch panel is formed, the input unit 8 is a position input device that detects and inputs an operation position by a resistive film method or a capacitive method, and the output unit 9 is a display device. In this touch panel, the position input device is disposed on the display surface of the display device, and one or a plurality of input content candidates that can be input is displayed on the display device. When the user touches the display position at which the input content the user wishes to input is displayed, the position is detected by the position input device, and the display content displayed at the detected position is input as the input content of the user operation to the spectrometer D. In such a touch panel, the user can easily understand an input operation intuitively, and thus, the spectrometer D easy for the user to handle is provided.

The IF unit 10 is a circuit that is connected to the control processing unit 6, and, under the control of the control processing unit 6, inputs/outputs data to/from an external device. For example, the IF unit 10 is an interface circuit of RS-232C, which is a serial communication method, an interface circuit using the Bluetooth (registered trademark) standard, an interface circuit that performs infrared communication compliant with the infrared data association (IrDA) standard, an interface circuit using the universal serial bus (USB) standard, or the like. Alternatively, the IF unit 10 may be a circuit that performs communication with an external device. For example, the IF unit 10 may be a data communication card, a communication interface circuit compliant with the IEEE 802.11 standard, or the like.

The storage unit 7 is a circuit that is connected to the control processing unit 6, and, under the control of the control processing unit 6, stores various kinds of predetermined programs and various kinds of predetermined data. The various kinds of predetermined programs include, for example, control processing programs, such as a control program for controlling the respective components 1, 2, 5, and 7 through 10 of the spectrometer D, a wavelength shift correction program for determining a wavelength variation on the basis of an output of the spectroscopic unit 5 in a case where wavelength shift correction light is emitted from the wavelength shift correction light source 1, a spectroscopic optical characteristics calculation program for determining spectroscopic optical characteristics such as spectral reflectance, spectral transmittance, and spectral radiance, for example, on the basis of an output of the spectroscopic unit 5 in a case where measurement light is emitted from the measurement light source 2. The various kinds of predetermined data include data necessary for executing these programs, such as the name of the measurement object SP, and wavelength calculation table information to be used for determining the wavelength of the emission-line light whose wavelength has been shifted in the device. Such a storage unit 7 includes a read only memory (ROM) that is a nonvolatile storage element, an electrically erasable programmable read only memory (EEPROM) that is a rewritable nonvolatile storage element, or the like, for example. The storage unit 7 includes a random access memory (RAM) that serves as a so-called working memory for the control processing unit 6 that stores data generated during execution of the predetermined programs. The storage unit 7 functionally includes a wavelength calculation table information storage unit 71 that stores the wavelength calculation table information.

The wavelength calculation table information is information that is in a table format and indicates, for each of the wavelengths that are a predetermined wavelength apart, the correspondence relationship between a predetermined ratio in respective electrical signals and the respective wavelengths of the respective rays of emission-line light or the wavelength of one of the rays of emission-line light, in a predetermined wavelength range including the respective emission-line wavelengths of the rays of wavelength shift correction emission-line light. The predetermined ratio is a predetermined ratio in the respective electrical signals that are output from the specific photoelectric conversion elements 531 receiving the same number of the respective rays of emission-line light that have the same wavelength intervals as the respective emission-line wavelength intervals in the plurality of rays of wavelength shift correction emission-line light, and have the same intensities as the rays of wavelength shift correction emission-line light. An example of that is shown in FIG. 11.

The control processing unit 6 is a circuit for controlling each of the components 1, 2, 5, and 7 through 10 of the spectrometer D in accordance with the functions of these respective components, calculating the wavelength variation, and obtaining the spectroscopic optical characteristics of the measurement object SP. The control processing unit 6 includes a central processing unit (CPU) and its peripheral circuits, for example. As the control processing programs are executed, the control processing unit 6 functionally includes a control unit 61, a wavelength shift correcting unit 62, and a spectroscopic optical characteristics calculating unit 63.

The control unit 61 controls the respective components 1, 2, 5, and 7 through 10 of the spectrometer D in accordance with the functions of these respective components, and also controls the entire spectrometer D.

The wavelength shift correcting unit 62 determines a wavelength variation on the basis of the output of the spectroscopic unit 5 obtained in a case where wavelength shift correction light is emitted from the wavelength shift correction light source 1. More specifically, in a case where wavelength shift correction light is measured as incident light by the spectrometer D serving as a spectrometer to be subjected to wavelength shift correction, the wavelength shift correcting unit 62 determines the wavelength shift correction time emission-line wavelength $\Lambda 1$ corresponding to preset reference wavelength shift correction emission-line light from a plurality of rays of wavelength shift correction emission-line light, on the basis of respective electrical signals that are output from a plurality of specific photoelectric conversion elements 531 that receive the plurality of rays of wavelength shift correction emission-line light in the plurality of photoelectric conversion elements 531 in the light receiving unit 53. The wavelength shift correcting unit 62 then determines a wavelength variation $\delta\Lambda$ from the difference between the determined wavelength shift correction time emission-line wavelength Λ1 and the known emission-line wavelength Λ0 of the reference wavelength shift correction emission-line light. In this embodiment, in a case where the wavelength shift correction light is measured as the incident light with the spectrometer D serving as the spectrometer to be subjected to wavelength shift correction, the wavelength shift correcting unit 62 determines the predetermined ratio from the respective electrical signals output from the plurality of specific photoelectric conversion elements 531, and determines the wavelength shift correction time emission-line wavelength Λ1 from the determined predetermined ratio and the wavelength calculation table stored in the wavelength calculation table information storage unit 71. In this embodiment, the wavelength shift correcting unit 62 then performs wavelength shift correction on the spectrometer D, on the basis of the determined wavelength variation δΛ. Alternatively, the wavelength shift correcting unit 62 warns that wavelength shift correction is necessary, on the basis of the determined wavelength variation δΛ. The wavelength shift correction will be described later in detail.

The spectroscopic optical characteristics calculating unit 63 determines predetermined spectroscopic optical characteristics such as spectral reflectance, spectral transmittance, and spectral radiance, for example, by a known calculation technique, on the basis of the electrical signals that have been output from the spectroscopic unit 5 and correspond to the respective light intensities of the respective rays of dispersed spectral light. The spectroscopic optical characteristics calculating unit 63 outputs the determined spectroscopic optical characteristics to the output unit 9, and, if necessary, to the IF unit 10.

Figure 4:
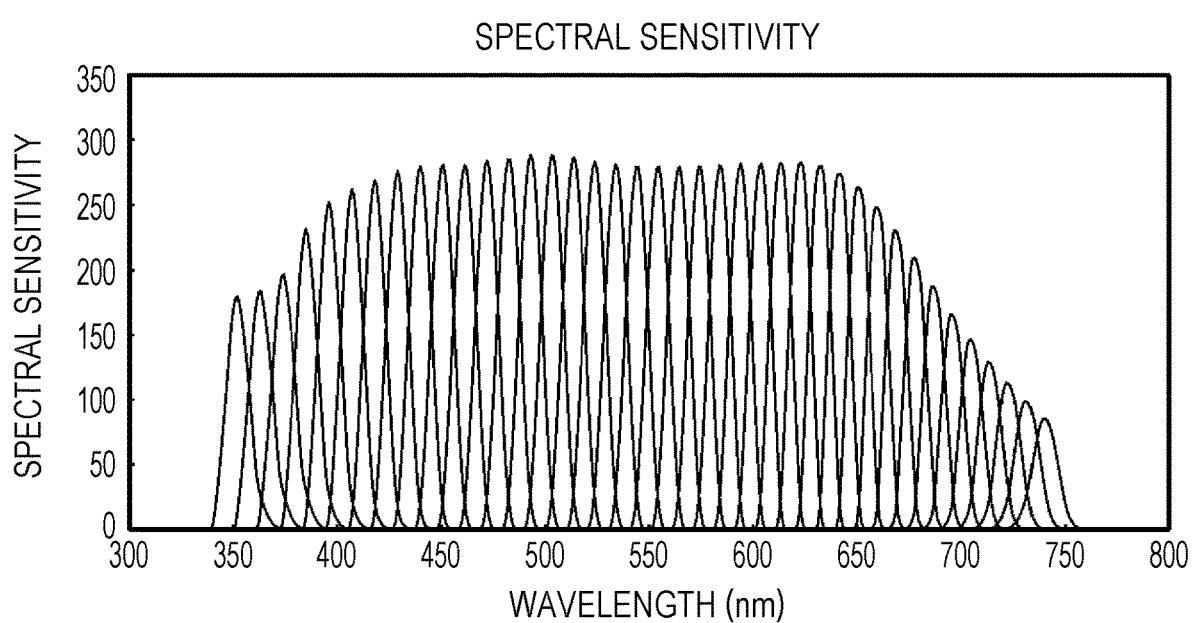
FIG. 4 is a graph showing an example of the spectral sensitivity of a light receiving unit in the spectrometer.
Figure 5A:
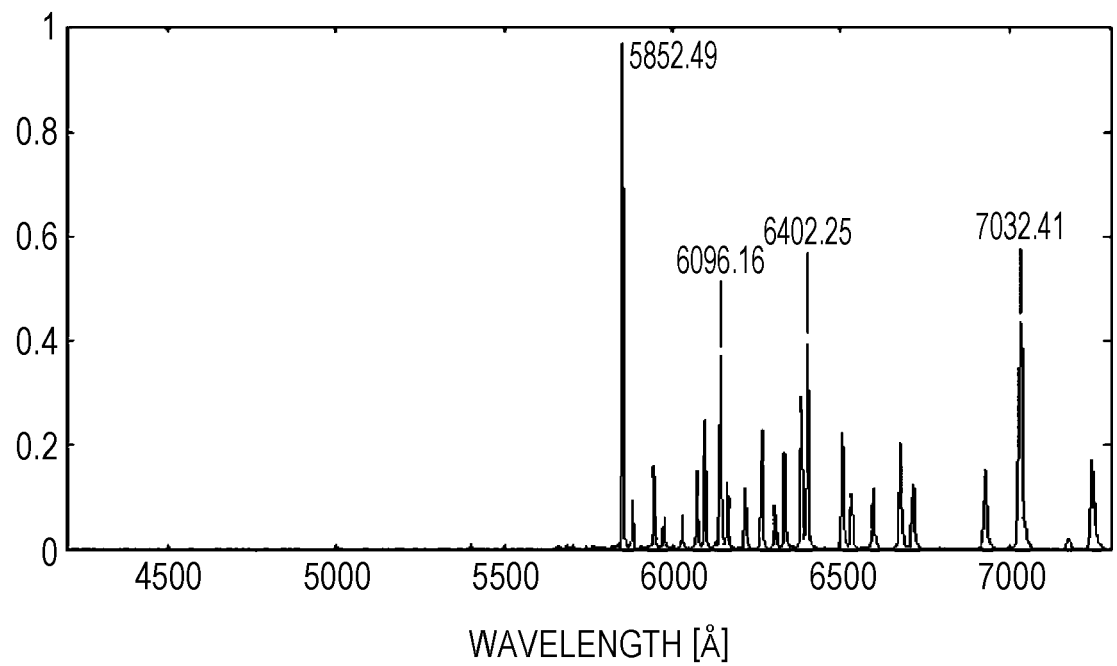
FIG. 5 is a graph showing the spectrum of a wavelength shift correction light source in the spectrometer.
Figure 5B:
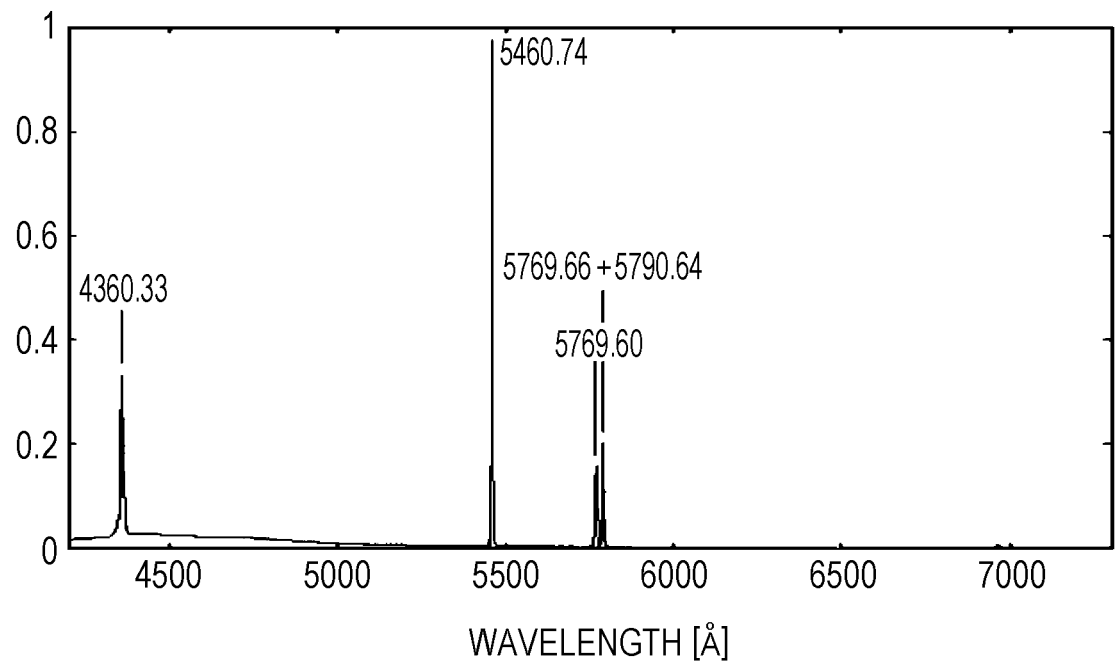
Figure 6:
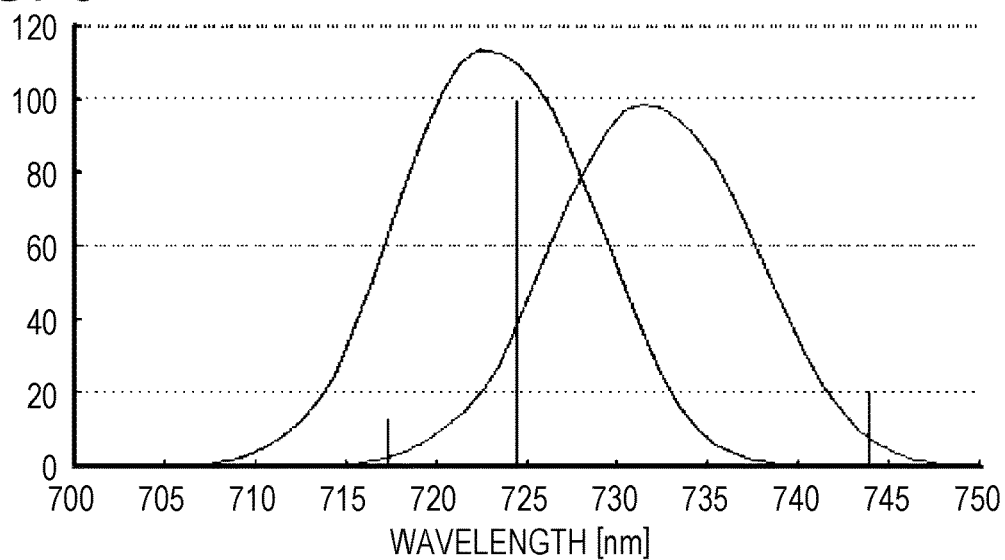
FIG. 6 is a graph for explaining the relationship between the spectral sensitivity of the light receiving unit and a plurality of rays of emission-line light included in wavelength shift correction light emitted from the wavelength shift correction light source.
Figure 7:
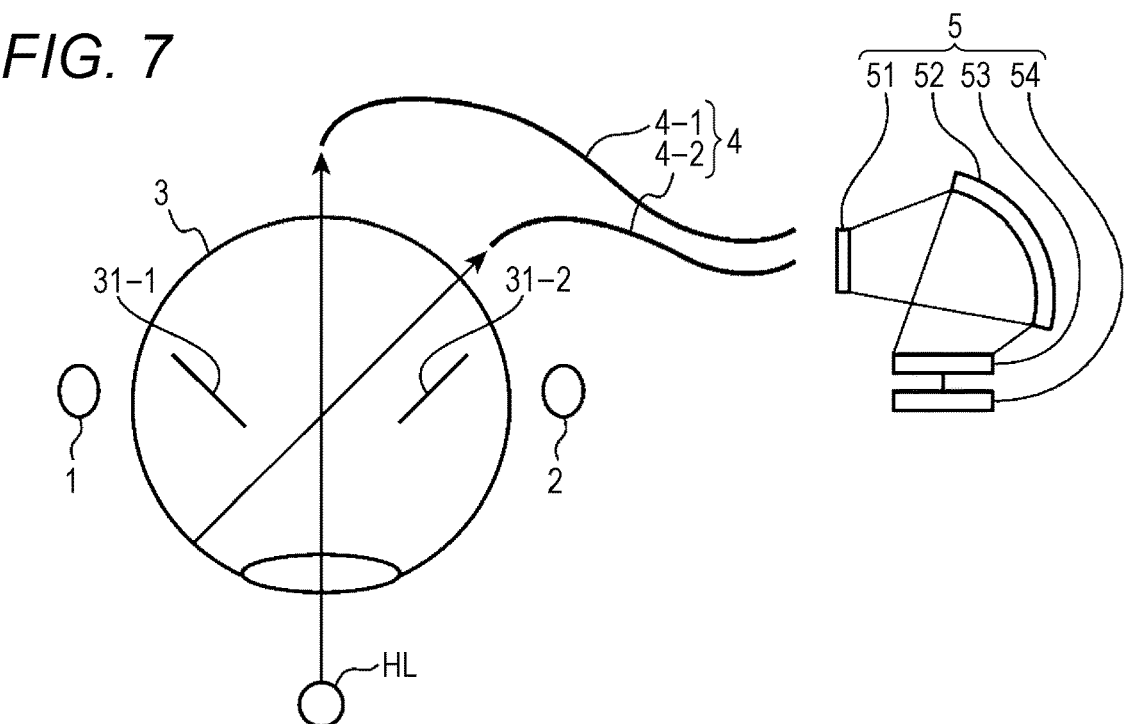
FIG. 7 is a diagram for explaining how to determine a gain ratio in the spectrometer.
Figure 8:
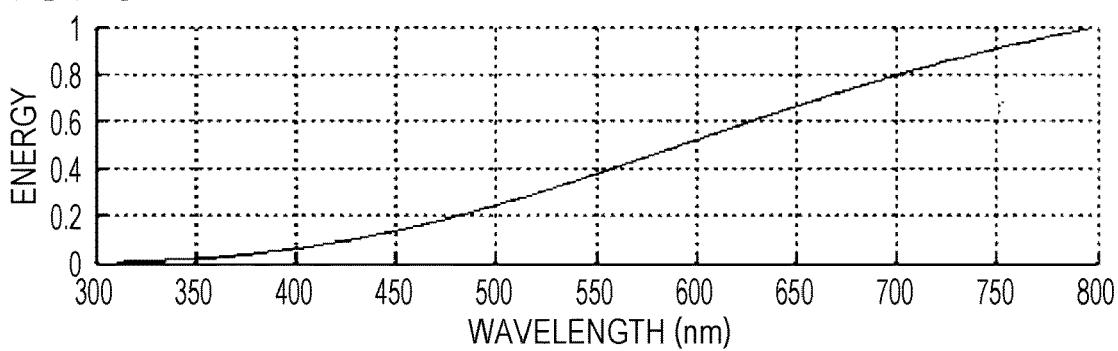
FIG. 8 is a graph showing the spectral radiance of a halogen lamp in a case where temperature is 2871 K.
Figure 9:
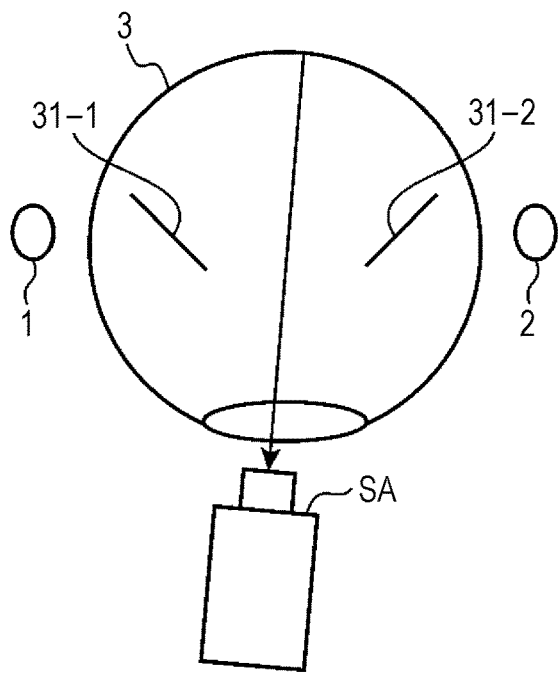
FIG. 9 is a diagram for explaining how to determine the light intensity of emission-line light in the spectrometer.
Figure 10:
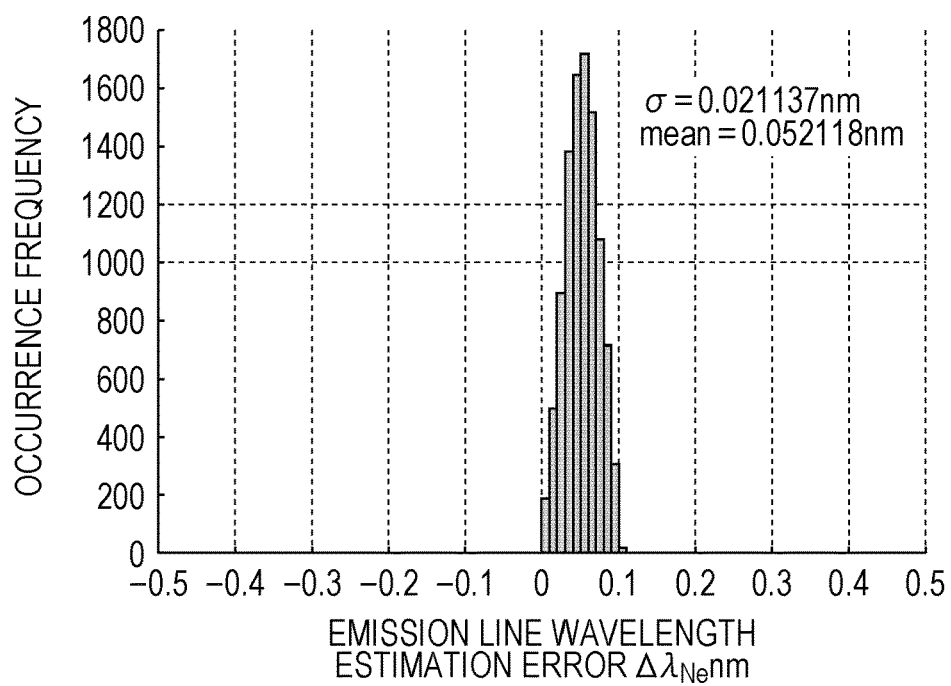
FIG. 10 is a graph showing the results of a simulation of the wavelength estimation errors to be caused by fluctuations of an emission-line light intensity ratio.
Figure 11A:
FIG. 11 is a diagram showing a wavelength calculation table stored in the spectrometer.
Figure 11B:

Next, wavelength shift correction is described. FIG. 4 is a graph showing an example of the spectral sensitivity of the light receiving unit in the spectrometer. The abscissa axis in FIG. 4 indicates wavelength expressed in nanometers (nm), and the ordinate axis indicates sensitivity (spectral sensitivity). FIG. 5 is a graph showing the spectrum of the wavelength shift correction light source in the spectrometer. FIG. 5A shows the spectrum of a neon lamp (a Ne lamp). FIG. 5B shows the spectrum of a mercury lamp (a Hg lamp). Each abscissa axis in FIG. 5A and FIG. 5B indicates wavelength expressed in nm, and each ordinate axis indicates light intensity. FIG. 6 is a graph for explaining the relationship between the spectral sensitivity of the light receiving unit and a plurality of rays of emission-line light included in the wavelength shift correction light emitted from the neon lamp of the wavelength shift correction light source. The abscissa axis in FIG. 6 indicates wavelength expressed in nm, and the ordinate axis indicates the sensitivity (spectral sensitivity) to the spectral sensitivity, and the light intensity to the emission-line light. FIG. 7 is a diagram for explaining how to determine a gain ratio in the spectrometer. FIG. 8 is a graph showing the spectral radiance of a halogen lamp in a case where temperature is 2871 K. The abscissa axis in FIG. 8 indicates wavelength expressed in nm, and the ordinate axis indicates energy. FIG. 9 is a diagram for explaining how to determine the light intensity of emission-line light in the spectrometer. FIG. 10 is a graph showing the results of a simulation of the wavelength estimation errors to be caused by fluctuations of the emission-line light intensity ratio. The abscissa axis in FIG. 10 indicates emission-line wavelength estimation error, and the ordinate axis indicates occurrence frequency. FIG. 11 is a diagram showing a wavelength calculation table stored in the spectrometer. FIG. 11A shows the wavelength calculation table of the first mode. FIG. 11B shows the wavelength calculation table of the second mode.

With the spectrometer D having such a configuration, the spectrum cannot be measured correctly simply after assembling is completed. For example, at the factory or the like before shipment, it is necessary to assign wavelength (center wavelengths) to the respective photoelectric conversion elements 531 in the light receiving unit 53, and adjusts the signal levels to be output from the respective photoelectric conversion elements 531. Such an initial calibration method is disclosed in JP 2017-032293 A and the like, for example.

By this calibration method disclosed in JP 2017-032293 A, primary calibration is performed on each of first individuals that are individual spectroscopic devices 1000. In the primary calibration, the measurement light 1020 for the primary calibration containing an emission line component is measured by the first individuals. Measurement light 1020 for secondary calibration is measured by each of the first individuals, and spectral characteristics are output. The plurality pieces of output spectral characteristics are averaged, so that average spectral characteristics are determined. Secondary calibration is performed on second individuals that are the individual spectroscopic devices 1000. In the secondary calibration, the measurement light 1020 for secondary calibration is measured by the second individuals, and the spectral characteristics to be output are brought close to the average spectral characteristics. In both the primary calibration and the secondary calibration, calibration parameters that determine the spectral sensitivity of a sensor 1031 are adjusted. Note that the reference numerals given to the respective components in this paragraph are those used in JP 2017-032293 A.

With attention being paid to one photoelectric conversion element 531 among the photoelectric conversion elements 531 in the light receiving unit 53 after such calibration is performed, the wavelength of the light received by the subject photoelectric conversion element 531 is obvious from the wavelength (the center wavelength) assigned to the subject photoelectric conversion element 531, and the intensity of the light received by the subject photoelectric conversion element 531 is obvious from the signal output from the subject photoelectric conversion element 531. Accordingly, it is possible to measure the respective wavelengths and the respective light intensities, which are the spectrum, on the basis of the respective signals output from the respective photoelectric conversion elements 531 in the light receiving unit 53.

After such initial calibration is performed, the spectrometer D is used. After time has elapsed, shifts (wavelength shifts) from the wavelengths (the center wavelengths) assigned in the initial calibration occur in the respective photoelectric conversion elements 531 in the light receiving unit 53, due to an age-related change or the like, for example. For this reason, after the initial calibration is performed, it is necessary to perform wavelength shift correction on the spectrometer D as needed.

Therefore, in this embodiment, a plurality of rays of wavelength shift correction emission-line light is received by a plurality of photoelectric conversion elements (specific photoelectric conversion elements) 531 in the light receiving unit 53. In a case where at least one of the specific photoelectric conversion elements 531 receives a plurality of the rays of wavelength shift correction emission-line light, wavelength shift correction is performed on the spectrometer D, on the basis of the output ratio of the respective outputs from these photoelectric conversion elements 531. For example, in a case where the light receiving unit 53 in the spectroscopic unit 5 has the spectral sensitivity shown in FIG. 4, for example, the respective rays of wavelength shift correction emission-line light of 717.4 nm, 724.5 nm, and 743.89 nm in emission-line wavelength emitted from a neon lamp are received by two specific photoelectric conversion elements 531 in the light receiving unit 53, as shown in FIG. 6. When the wavelength shifts occur due to the age-related change or the like, the output ratio in the two specific photoelectric conversion elements 531 also changes with the amount of the wavelength shifts (a wavelength shift amount, or a wavelength variation). Therefore, a table showing the correspondence relationship between the output ratio and the wavelength in these two specific photoelectric conversion elements 531 for each predetermined wavelength interval in a predetermined wavelength range including those emission-line wavelengths 717.4 nm, 724.5 nm, and 743.89 nm is prepared beforehand, so that the emission-line wavelength at the time of wavelength shift correction is determined from the output ratio in these two specific photoelectric conversion elements 531 at the time of wavelength shift correction, and thus, the wavelength shift amount is obtained.

More specifically, first, each of the photoelectric conversion elements 531 in the light receiving unit 53 is referred to as a "channel", and channel numbers i are sequentially assigned, starting from the photoelectric conversion element 531 that receives the shortest-wavelength light to the photoelectric conversion element 531 that receives the longest-wavelength light. In the example illustrating in FIG. 4, the number of the photoelectric conversion elements 531 in the light receiving unit 53 is 40. In this case, the channel numbers i are integer values from 1 to 40. The channel (a photoelectric conversion element 531) with a channel number i is represented by Ch(i). The spectral sensitivity of the channel Ch(i) is represented by Res(Ch(i), $\lambda$) ($\lambda$ representing the wavelength). The gain of the preprocessing unit 54 that performs preprocessing on an output of the channel Ch(i) (the gain of the charge storage circuit 54a shown in FIG. 3A, or the gain in the I-V conversion circuit 54b shown in FIG. 3B) is represented by G(Ch(i)). An electrical signal of the channel Ch(i) output from the spectroscopic unit 5 (a digital signal output from the A/D conversion circuit 545a of the charge storage circuit 54a shown in FIG. 3A, or a digital signal output from the A/D conversion circuit 543b of the I-V conversion circuit 54b shown in FIG. 3B) is represented by Count(Ch(i)). As shown as an example in FIG. 6, in a case where wavelength shift correction is performed with the use of the three rays of first through third rays of emission-line light having emission-line wavelengths of 717.4 nm, 724.5 nm, and 743.89 nm (it is of course possible to use rays of emission-line light having other emission-line wavelengths), and where the respective light intensities in the first through third rays of emission-line light are represented by A(1), A(2), and A(3) (A(k), k=1, 2, and 3) while the respective emission-line wavelengths in the first through third rays of emission-line light are represented by $\lambda_{Ne}(1)$, $\lambda_{Ne}(2)$, and $\lambda_{Ne}(3)$ ($\lambda_{Ne}(k)$, k=1, 2, and 3), the electrical signal $Count_0(Ch(i))$ of the channel Ch(i) is expressed by the equation (1) shown below, and the electrical signal $Count_0(Ch(i+1))$ of the channel Ch(i+1) directly next to the channel Ch(i) is expressed by the equation (2) shown below. Since the emission-line wavelength of a neon lamp has a constant value as described above, the equation (3) and the equation (4) shown below are established. Here, the three rays of the first through third rays of emission-line light having the emission-line wavelengths of 717.4 nm, 724.5 nm, and 743.89 nm correspond to an example of a plurality of rays of wavelength shift correction emission-line light, and the channel Ch(i) (the photoelectric conversion element 531 with the channel number i) and the channel Ch(i+1) (the photoelectric conversion element 531 with the channel number i+1) correspond to an example of a plurality of specific photoelectric conversion elements that receive the plurality of rays of wavelength shift correction emission-line light among the photoelectric conversion elements. In the example illustrated in FIG. 6, i=37.

[Mathematical Formula 1]

$$Count_0(Ch(i)) = \sum_{k=1}^{3} G(Ch(i)) \cdot A(k) \cdot Res(Ch(i), \lambda_{Ne}(k)) \quad (1)$$

[Mathematical Formula 2]

$$Count_0(Ch(i+1)) = \sum_{k=1}^{3} G(Ch(i+1)) \cdot A(k) \cdot Res(Ch(i+1), \lambda_{Ne}(k)) \quad (2)$$

[Mathematical Formula 3]

$$\lambda_{Ne}(1) = \lambda_{Ne}(2) - 7.1 \text{ nm} \quad (3)$$

[Mathematical Formula 4]

$$\lambda_{Ne}(3) = \lambda_{Ne}(2) + 19.39 \text{ nm} \quad (4)$$

Accordingly, the ratio of the electrical signal $Count_0(Ch(i+1))$ of the channel Ch(i+1) to the electrical signal $Count_0(Ch(i))$ of the channel Ch(i) (=$Count_0(Ch(i+1))/Count_0(Ch(i))$) is expressed by the equation (5) shown below. Here, this ratio of the electrical signal $Count_0(Ch(i+1))$ of the channel Ch(i+1) to the electrical signal $Count_0(Ch(i))$ of the channel Ch(i) (=$Count_0(Ch(i+1))/Count_0(Ch(i))$) corresponds to an example of the predetermined ratio in the respective electrical signals output from the plurality of specific photoelectric conversion elements.

[Mathematical Formula 5]

$$\frac{Count_0(Ch(i+1))}{Count_0(Ch(i))} = \frac{G(Ch(i+1))}{G(Ch(i))} \cdot \frac{\frac{A(1)}{A(2)} \cdot Res(Ch(i+1), \lambda_{Ne}(2)-7.1) + Res(Ch(i+1), \lambda_{Ne}(2)) + \frac{A(3)}{A(2)} \cdot Res(Ch(i+1), \lambda_{Ne}(2)+19.39)}{\frac{A(1)}{A(2)} \cdot Res(Ch(i), \lambda_{Ne}(2)-7.1) + Res(Ch(i), \lambda_{Ne}(2)) + \frac{A(3)}{A(2)} \cdot Res(Ch(i), \lambda_{Ne}(2)+19.39)} \quad (5)$$

It is possible to obtain the gain ratio $G(Ch(i+1))/G(Ch(i))$ in the equation (5) by using a white light source whose spectral radiance $L_{Halogen}(\lambda)$ is known, such as a halogen lamp, for example. In other words, in a case where a halogen lamp is measured, the electrical signal $Count_1(Ch(i))$ of the channel Ch(i) is expressed by the equation (6) shown below, and the electrical signal $Count_1(Ch(i+1))$ of the channel Ch(i+1) is expressed by the equation (7) shown below. According to these equations, the gain ratio $G(Ch(i+1))/G(Ch(i))$ in the equation (5) is expressed by the equation (8) shown below.

[Mathematical Formula 6]

$$Count_1(Ch(i)) = G(Ch(i)) \cdot \int Res(Ch(i), \lambda) \cdot L_{Halogen}(\lambda) d\lambda \qquad (6)$$

[Mathematical Formula 7]

$$Count_1(Ch(i+1)) = G(Ch(i+1)) \cdot \int Res(Ch(i+1), \lambda) \cdot L_{Halogen}(\lambda) d\lambda \qquad (7)$$

[Mathematical Formula 8]

$$\frac{G(Ch(i+1))}{G(Ch(i))} = \frac{Count_1(Ch(i+1))}{Count_1(Ch(i))} \cdot \frac{\int Res(Ch(i), \lambda) \cdot L_{Halogen}(\lambda) d\lambda}{\int Res(Ch(i+1), \lambda) \cdot L_{Halogen}(\lambda) d\lambda} \qquad (8)$$

Therefore, to perform wavelength shift correction by using the equation (5), the spectral sensitivity $Res(Ch(i), \lambda)$ of the spectroscopic unit 5 is first measured with a monochromator at the factory or the like during the manufacture or before shipment or the like, for example. A halogen lamp HL whose spectral radiance $L_{Halogen}(\lambda)$ is known is then measured with a spectrometer D serving as the spectrometer to be subjected to wavelength shift correction, as shown in FIG. 7. As a result, the electrical signal $Count_1(Ch(i))$ of the channel $Ch(i)$ and the electrical signal $Count_1(Ch(i+1))$ of the channel $Ch(i+1)$ are actually measured, and the gain ratio $G(Ch(i+1))/G(Ch(i))$ is determined according to the equation (6). Note that the spectral radiance $L_{Halogen}(\lambda)$ of the halogen lamp HL is shown in FIG. 8. Here, the second ray of emission-line light corresponds to an example of the reference wavelength shift correction emission-line light that has been set beforehand from the plurality of rays of wavelength shift correction emission-line light, and the emission-line wavelength of 724.5 nm corresponds to an example of the known emission-line wavelength ($\Lambda 0$) of the reference wavelength shift correction emission-line light.

Next, as shown in FIG. 9, with the measurement light source 2 turned off, the wavelength shift correction light source 1, which is the neon lamp, is turned on, and the respective light intensities A(1), A(2), and A(3) in the first through third rays of emission-line light are measured by a spectral luminance meter SA. The spectral luminance meter SA that measures the respective light intensities A(1), A(2), and A(3) in the first through third rays of emission-line light needs to have sufficiently narrow measurement wavelength intervals and half-value width so as to be able to measure the first through third rays of emission-line light separately from one another.

A table that indicates, for each of the wavelengths that are a predetermined wavelength apart, the correspondence relationship between a predetermined ratio in respective electrical signals and the respective wavelengths of the respective rays of emission-line light or the wavelength of one of the rays of emission-line light, in a predetermined wavelength range including the respective emission-line wavelengths of the rays of wavelength shift correction emission-line light is prepared. The predetermined ratio is a predetermined ratio in the respective electrical signals that are output from the specific photoelectric conversion elements that receive the plurality of rays of wavelength shift correction emission-line light by receiving the same number of the respective rays of emission-line light as the rays of wavelength shift correction emission-line light, the respective rays of emission-line light having the same wavelength intervals as the respective emission-line wavelength intervals in the plurality of rays of wavelength shift correction emission-line light. This table is stored as the wavelength calculation table information into the wavelength calculation table information storage unit 71.

In one example, in a case where the plurality of rays of wavelength shift correction emission-line light is the first through third rays of emission-line light, the wavelength calculation table is a table LTa shown in FIG. 11A. In practice, there is the relationship expressed by the above equation (3) and equation (4) among the first through third emission-line wavelengths. Therefore, the wavelength calculation table is a table LTb that shows the relationship between the second emission-line wavelength $\lambda_{Ne}(2)$ and the count ratio $Count_0(Ch(i+1))/Count_0(Ch(i))$ at wavelength intervals of 1 nm in a predetermined wavelength range including the second emission-line wavelength $\lambda_{Ne}(2)$ (=724.5 nm), as shown in FIG. 11B. Such wavelength calculation table information is stored in the wavelength calculation table information storage unit 71.

In the initial wavelength measurement, wavelength shift correction is performed by the wavelength shift correction method disclosed in JP 2017-032293 A, as described above. Alternatively, a white panel is brought close to the measurement aperture of the integrating sphere 3, and, under the control of the control processing unit 6, the wavelength shift correction light source 1 of the neon lamp is turned on, with the measurement light source 2 turned off. The wavelength shift correcting unit 62 of the control processing unit 6 then obtains the electrical signal $Count_0(Ch(i))$ and the electrical signal $Count_0(Ch(i+1))$ from the spectroscopic unit 5, and determines the count ratio $Count_0(Ch(i+1))/Count_0(Ch(i))$. The wavelength shift correcting unit 62 then determines the wavelength corresponding to this count ratio $Count_0(Ch(i+1))/Count_0(Ch(i))$ to be the known emission-line wavelength $\Lambda 0$ of the reference wavelength shift correction emission-line light, from the wavelength calculation table information stored in the wavelength calculation table information storage unit 71, and stores the emission-line wavelength $\Lambda 0$ into the storage unit 7.

In wavelength shift correction, a white panel is brought close to the measurement aperture of the integrating sphere 3, and the wavelength shift correction light source 1 of the neon lamp is turned on by the control unit 61 of the control processing unit 6, with the measurement light source 2 turned off. The wavelength shift correcting unit 62 of the control processing unit 6 then obtains the electrical signal $Count_0(Ch(i))$ and the electrical signal $Count_0(Ch(i+1))$ from the spectroscopic unit 5, and determines the count ratio $Count_0(Ch(i+1))/Count_0(Ch(i))$. The wavelength shift correcting unit 62 then determines the wavelength corresponding to this count ratio $Count_0(Ch(i+1))/Count_0(Ch(i))$ to be the wavelength shift correction time emission-line wavelength $\Lambda 1$, from the wavelength calculation table information stored in the wavelength calculation table information storage unit 71. The wavelength variation $\delta\Lambda$ (=$\Lambda 1-\Lambda 0$) is then determined from the difference between the determined wavelength shift correction time emission-line wavelength $\Lambda 1$ and the known emission-line wavelength $\Lambda 0$ of the reference wavelength shift correction emission-line light corresponding to the wavelength shift correction time emission-line wavelength $\Lambda 1$, or the difference between the determined wavelength shift correction time emission-line wavelength $\Lambda 1$ and the second emission-line wavelength $\lambda_{Ne}(2)$ in the above example. The wavelength variation $\delta\Lambda$ is stored into the storage unit 7.

Note that, in the above description, the known emission-line wavelength $\Lambda 0$ of the wavelength shift correction emission-line light is the emission-line wavelength at the time of initial wavelength shift correction in the wavelength shift correction emission-line light, as measured in the initial wavelength measurement. However, the known emission-line wavelength $\Lambda 0$ may be the inherent emission-line wavelength (the second emission-line wavelength $\lambda_{Ne}(2)=$ 724.5 nm in the above example) in the wavelength shift correction emission-line light. Further, in this embodiment, the wavelength calculation table information includes the correspondence relationship at wavelength intervals of 1 nm. Accordingly, the known emission-line wavelength $\Lambda 0$ of the reference wavelength shift correction emission-line light and the wavelength shift correction time emission-line wavelength $\Lambda 1$ may be determined on the subnanometer order, for example, through linear interpolation or the like.

Here, to determine the wavelength shift correction time emission-line wavelength $\Lambda 1$ from the wavelength calculation table information, the ratio A(1)/A(2) and the ratio A(3)/A(2) determined from the respective light intensities A(1), A(2), and A(3) in the first through third rays of emission-line light need to have little variation between the time of measurement and the time of wavelength shift correction at the factory or the like before shipment, for example. However, even if the ratio A(1)/A(2) and the ratio A(3)/A(2) vary within the range of −20% to +20%, the emission-line wavelength is determined with an accuracy of ±0.05 nm, and thus, it is possible to determine the emission-line wavelength with a sufficiently high accuracy, as shown in FIG. 10. FIG. 10 shows the results of a simulation of emission-line wavelength estimation errors in a case where both the ratio A(1)/A(2) and ratio A(3)/A(2) were varied randomly within the range from −20% to +20%.

At a time of measurement, the measurement object SP is brought to the measurement aperture of the integrating sphere 3, and measurement light is emitted from the measurement light source 2 under the control of the control processing unit 6. The spectroscopic optical characteristics calculating unit 63 of the control processing unit 6 determines predetermined spectroscopic optical characteristics such as spectral reflectance, for example, by a known calculation technique, on the basis of the respective electrical signals that have been output from the spectroscopic unit 5 and correspond to the respective light intensities of the respective rays of dispersed spectral light. At this stage, the wavelength of the spectral sensitivity Res(Ch(i), λ) of each channel Ch(i) is uniformly corrected by the wavelength variation δΛ, and thus, wavelength shifts caused by an age-related change or the like are corrected.

As described above, the spectrometer D in this embodiment is automatically subjected to wavelength shift correction before use, and then measures spectroscopic optical characteristics.

Alternatively, in a case where the wavelength shift correcting unit 62 compares the wavelength variation δA with a predetermined threshold that is appropriately set in advance, and the result of the comparison shows that the wavelength variation δA exceeds the predetermined threshold, the spectrometer D may output, from the output unit 9, a warning to the effect that wavelength shift correction is necessary. In this manner, it is possible to make the user recognize the necessity of wavelength shift correction.

As described above, the wavelength shift correction system incorporated in the spectrometer D and the wavelength shift correction method in this embodiment are hardly affected by emission line intervals, because at least one of the specific photoelectric conversion elements receives a plurality of rays in the plurality of rays of wavelength shift correction emission-line light.

In the wavelength shift correction system and the wavelength shift correction method, the wavelength calculation table information is stored beforehand into the wavelength calculation table information storage unit 71, so that the wavelength shift correction time emission-line wavelength $\Lambda 1$ can be easily determined with the use of the wavelength calculation table information.

In the wavelength shift correction system and the wavelength shift correction method, a neon lamp is used as the wavelength shift correction light source 1, and thus, costs can be lowered.

Note that, although the wavelength shift correction light source 1 is included in the spectrometer D serving as the spectrometer to be subjected to wavelength shift correction in the above embodiment, the wavelength shift correction light source 1 may be a structure independent of the spectrometer D serving as the spectrometer to be subjected to wavelength shift correction.

Figure 12:
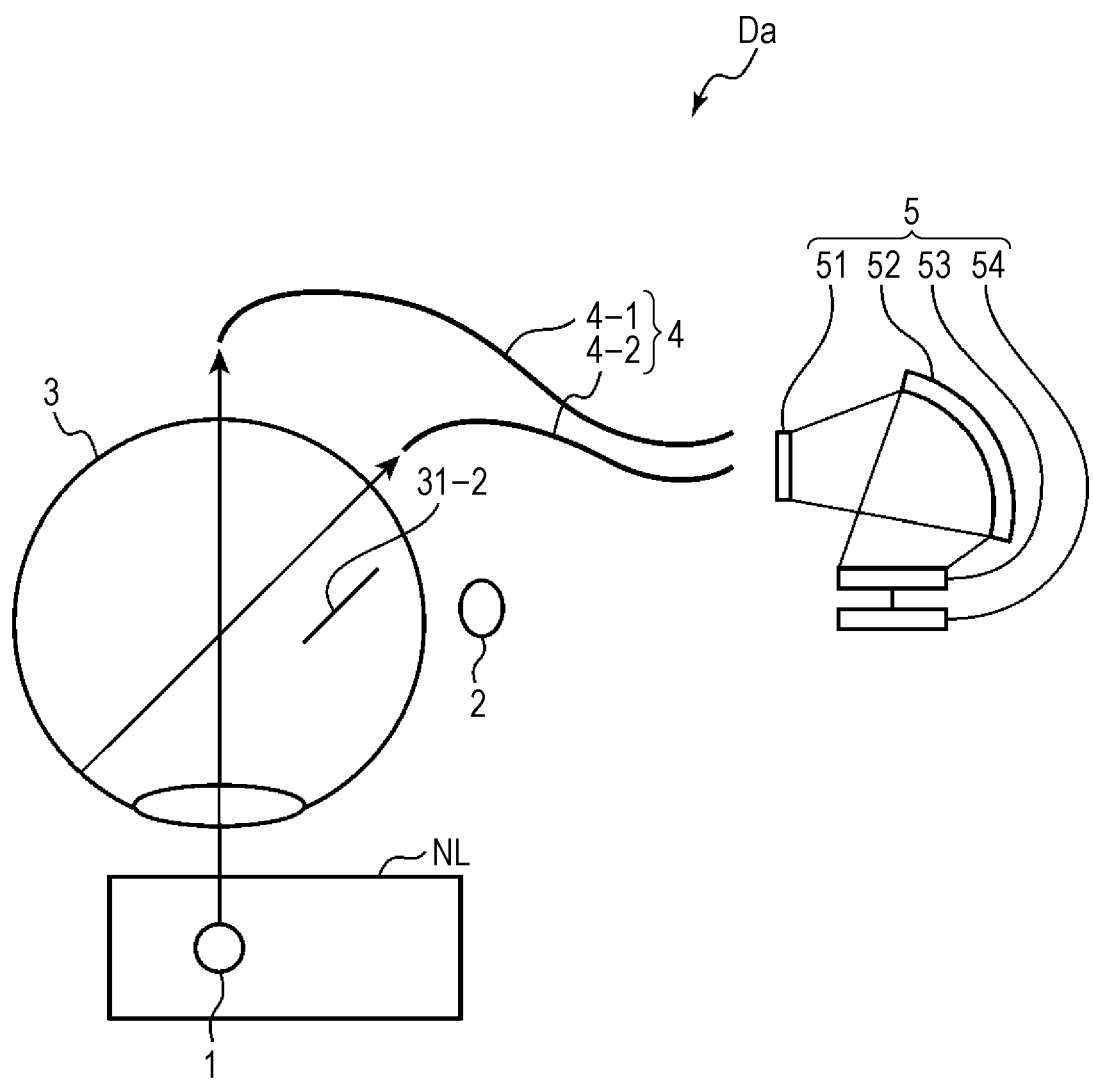
FIG. 12 is a diagram showing a modification of the wavelength shift correction system and the spectrometer.

FIG. 12 is a diagram showing a modification of the wavelength shift correction system and the spectrometer. As shown in FIG. 12, the wavelength shift correction system of the modification includes a wavelength shift correction light source unit NL and a spectrometer Da of the modification. The spectrometer Da of this modification includes a measurement light source 2, an integrating sphere 3, a light guide member 4, a spectroscopic unit 5, a control processing unit 6, a storage unit 7, an input unit 8, an output unit 9, an IF unit 10, and a housing (not shown) that houses these components. The measurement light source 2, the integrating sphere 3, the light guide member 4, the spectroscopic unit 5, the control processing unit 6, the storage unit 7, the input unit 8, the output unit 9, the IF unit 10, and the housing (not shown) in spectrometer Da of this modification are the same as the measurement light source 2, the integrating sphere 3, the light guide member 4, the spectroscopic unit 5, the control processing unit 6, the storage unit 7, the input unit 8, the output unit 9, the IF unit 10, and the housing (not shown) in the spectrometer D of the embodiment described above, respectively, and therefore, explanation thereof is not made herein.

Meanwhile, the wavelength shift correction light source unit NL is a device that emits wavelength shift correction light including a plurality of rays of wavelength shift correction emission-line light, and includes the same device as the wavelength shift correction light source 1 in the spectrometer D of the embodiment described above. For example, the wavelength shift correction light source unit NL includes a neon lamp, and a light emission circuit (a drive circuit) or the like that drives and causes the neon lamp to emit light.

In the wavelength shift correction system of such a modification, at a time of wavelength shift correction, the wavelength shift correction light source unit NL is brought to the measurement aperture of the integrating sphere 3 in the spectrometer Da, the neon lamp is turned on, and the wavelength shift correction is performed in the same manner as described above.

In the wavelength shift correction system and the wavelength shift correction method as described above, the wavelength shift correction light source unit NL is independent of the spectrometer Da serving as the spectrometer to be subjected to wavelength shift correction. Accordingly, the spectrometer Da can be made smaller in size. Furthermore, the wavelength shift correction light source unit NL is only required to be prepared at a time of wavelength shift correction as needed, and is not necessarily always prepared.

Further, in the embodiment described above, the plurality of specific photoelectric conversion elements are the two of the first and second photoelectric conversion elements Ch(i) and Ch(i+1) arranged adjacent to each other. However, the plurality of specific photoelectric conversion elements are not necessarily those two, as long as at least one of the specific photoelectric conversion elements receives a plurality of rays of the plurality of rays of wavelength shift correction emission-line light. For example, the plurality of specific photoelectric conversion elements may be the two of first and second photoelectric conversion elements arranged adjacent to each other via one or more photoelectric conversion elements. Alternatively, the plurality of specific photoelectric conversion elements may be three or more photoelectric conversion elements, for example. In such a case, the reference wavelength shift correction emission-line light is a plurality of rays having different emission-line wavelengths from one another. The wavelength shift correcting unit 62 determines a plurality of wavelength variations corresponding to the respective rays of the reference wavelength shift correction emission-line light, and lastly determines a wavelength variation from a representative value such as an average value or a median value on the basis of the plurality of wavelength variations determined as above. The wavelength shift correcting unit 62 then performs wavelength shift correction on the spectrometer to be subjected to wavelength shift correction. Further, the wavelength calculation table information storage unit 71 may store beforehand a plurality of tables corresponding to the respective rays of reference wavelength shift correction emission-line light. In a case where wavelength shift correction light is measured as incident light by the spectrometer to be subjected to wavelength shift correction with respect to the respective rays of reference wavelength shift correction emission-line light, the wavelength shift correcting unit 62 may determine the predetermined ratio from the respective electrical signals output from the plurality of specific photoelectric conversion elements corresponding to the reference wavelength shift correction emission-line light, and determine the wavelength shift correction time emission-line wavelength corresponding to the reference wavelength shift correction emission-line light, from the determined predetermined ratio and the table that is stored in the wavelength calculation table information storage unit 71 and corresponds to the reference wavelength shift correction emission-line light. The wavelength shift correcting unit 62 may then determine the wavelength variation from the difference between the determined wavelength shift correction time emission-line wavelength and the known emission-line wavelength of the reference wavelength shift correction emission-line light.

The present specification discloses various modes of technologies as described above, and the principal technologies are summarized below.

A wavelength shift correction system according to one mode includes: a wavelength shift correction light source that emits wavelength shift correction light including a plurality of rays of wavelength shift correction emission-line light; a spectrometer including a spectroscopic unit that receives respective rays of dispersed spectral light obtained by dispersing incident light in accordance with wavelength with a plurality of photoelectric conversion elements arranged in a direction of dispersion, and outputs respective electrical signals corresponding to respective light intensities of the respective rays of dispersed spectral light, the spectrometer being a spectrometer to be subjected to wavelength shift correction; and a wavelength shift correcting unit that determines a wavelength shift correction time emission-line wavelength corresponding to reference wavelength shift correction emission-line light on the basis of respective electrical signals output from a plurality of specific photoelectric conversion elements that receive the plurality of rays of wavelength shift correction emission-line light in the plurality of photoelectric conversion elements when the wavelength shift correction light is measured as the incident light with the spectrometer to be subjected to wavelength shift correction, and determines a wavelength variation from a difference between the determined wavelength shift correction time emission-line wavelength and a known emission-line wavelength of the reference wavelength shift correction emission-line light, the reference wavelength shift correction emission-line light being set beforehand from the plurality of rays of wavelength shift correction emission-line light. In the wavelength shift correction system, at least one of the plurality of specific photoelectric conversion elements receives a plurality of rays of the plurality of rays of wavelength shift correction emission-line light. In the above wavelength shift correction system, the spectrometer preferably includes a wavelength shift correcting unit. In the above wavelength shift correction system, the plurality of specific photoelectric conversion elements are preferably the two of first and second photoelectric conversion elements arranged adjacent to each other. In the above wavelength shift correction system, the plurality of specific photoelectric conversion elements are preferably the two of first and second photoelectric conversion elements arranged adjacent to each other via one of more photoelectric conversion elements. In the above wavelength shift correction system, the plurality of specific photoelectric conversion elements are preferably three or more photoelectric conversion elements, the reference wavelength shift correction emission-line light preferably includes a plurality of rays having different emission-line wavelengths from one another, and the wavelength shift correcting unit preferably determines a plurality of wavelength variations corresponding to the respective rays of the reference wavelength shift correction emission-line light, and lastly determines a wavelength variation from a representative value such as an average value or a median value on the basis of the plurality of the determined wavelength variations. In the above wavelength shift correction system, the known emission-line wavelength of the wavelength shift correction emission-line light is preferably the emission-line wavelength at the time of the initial wavelength measurement in the wavelength shift correction emission-line light, the emission-line wavelength being measured in the initial wavelength measurement conducted during the manufacture or before shipment for example. In the above wavelength shift correction system, the known emission-line wavelength of the wavelength shift correction emission-line light is preferably an intrinsic emission-line wavelength in the wavelength shift correction emission-line light.

Such a wavelength shift correction system is hardly affected by emission line intervals, because, at least one of the plurality of specific photoelectric conversion elements receives a plurality of rays of the plurality of rays of wavelength shift correction emission-line light.

In another mode, the above wavelength shift correction system further includes a table information storage unit that stores a table indicating, for respective wavelengths at predetermined wavelength intervals, the correspondence relationship between a predetermined ratio in respective electrical signals and the respective wavelengths of respective rays of emission-line light or one of the rays of emission-line light in a predetermined wavelength range including the respective emission-line wavelengths of the plurality of rays of wavelength shift correction emission-line light, the respective electrical signals being output from the plurality of specific photoelectric conversion elements receiving the same number of rays of emission-line light as the plurality of rays of wavelength shift correction emission-line light, the respective electrical signals having the same wavelength intervals as respective emission-line wavelength intervals in the plurality of rays of wavelength shift correction emission-line light. When the wavelength shift correction light is measured as the incident light with the spectrometer to be subjected to wavelength shift correction, the wavelength shift correcting unit determines the predetermined ratio from the respective electrical signals output from the plurality of specific photoelectric conversion elements, and determines the wavelength shift correction time emission-line wavelength, from the determined predetermined ratio and the table stored in the table information storage unit. In the above wavelength shift correction system, the plurality of specific photoelectric conversion elements are preferably the two of first and second photoelectric conversion elements, and the predetermined ratio is preferably the ratio between the first and second electrical signals output from the first and second photoelectric conversion elements, respectively. In the above wavelength shift correction system, the plurality of specific photoelectric conversion elements is preferably three or more photoelectric conversion elements, the reference wavelength shift correction emission-line light preferably includes a plurality of rays having different emission-line wavelengths from one another, and the table information storage unit preferably stores a plurality of tables corresponding to the respective rays of the reference wavelength shift correction emission-line light. When the wavelength shift correction light is measured as the incident light with the spectrometer to be subjected to wavelength shift correction with respect to the respective rays of the reference wavelength shift correction emission-line light, the wavelength shift correcting unit preferably determines the predetermined ratio from the respective electrical signals output from the plurality of specific photoelectric conversion elements corresponding to the reference wavelength shift correction emission-line light, and determines the wavelength shift correction time emission-line wavelength corresponding to the reference wavelength shift correction emission-line light, from the determined predetermined ratio and the table that is stored in the wavelength calculation table information storage unit and corresponds to the reference wavelength shift correction emission-line light. The wavelength shift correcting unit then preferably determines a wavelength variation from the difference between the determined wavelength shift correction time emission-line wavelength and the known emission-line wavelength of the reference wavelength shift correction emission-line light. The wavelength shift correcting unit preferably determines a wavelength variation from a representative value such as an average value or a median value on the basis of a plurality of wavelength variations determined with respect to the respective rays of the reference wavelength shift correction emission-line light.

In such a wavelength shift correction system, the table is stored beforehand into the table information storage unit, and thus, the wavelength shift correction time emission-line wavelength can be easily determined with the use of the table.

In another mode, in the above wavelength shift correction system, the wavelength shift correcting unit performs wavelength shift correction on the spectrometer to be subjected to wavelength shift correction, on the basis of the determined wavelength variation.

Such a wavelength shift correction system can automatically perform wavelength shift correction on the spectrometer to be subjected to wavelength shift correction, on the basis of the determined wavelength variation.

In another mode, in the above wavelength shift correction system, the wavelength shift correcting unit issues a warning to the effect that wavelength shift correction is necessary, on the basis of the determined wavelength variation.

Such a wavelength shift correction system can make the recognize the necessity of wavelength shift correction.

In another mode, in the above wavelength shift correction system, the wavelength shift correction light source includes a neon lamp.

Since such a wavelength shift correction system uses a neon lamp as the wavelength shift correction light source, the costs can be lowered.

In another mode, in the above wavelength shift correction system, the wavelength shift correction light source is incorporated in the spectrometer to be subjected to wavelength shift correction.

In such a wavelength shift correction system, the spectrometer to be subjected to wavelength shift correction includes the wavelength shift correction light source, and accordingly, there is no need to prepare the wavelength shift correction light source separately.

In another mode, in the above wavelength shift correction system, the wavelength shift correction light source is a structure independent of the spectrometer to be subjected to wavelength shift correction.

In such a wavelength shift correction system, the wavelength shift correction light source is a structure independent of the spectrometer to be subjected to wavelength shift correction. Accordingly, the spectrometer can be made smaller in size, and the wavelength shift correction light source is only required to be prepared at a time of wavelength shift correction as needed, and is not necessarily always prepared.

A wavelength shift correction method according to another mode is a wavelength shift correction method for performing wavelength shift correction on a spectrometer to be subjected to wavelength shift correction, involving: a wavelength shift correction light source that emits wavelength shift correction light including a plurality of rays of wavelength shift correction emission-line light; and a spectrometer including a spectroscopic unit that receives respective rays of dispersed spectral light obtained by dispersing incident light in accordance with wavelength with a plurality of photoelectric conversion elements arranged in a direction of dispersion, and outputs respective electrical signals corresponding to respective light intensities of the respective rays of dispersed spectral light, the spectrometer being the spectrometer to be subjected to wavelength shift correction. The wavelength shift correction method includes: a first step of determining a wavelength shift correction time emission-line wavelength corresponding to reference wavelength shift correction emission-line light on the basis of respective electrical signals output from a plurality of photoelectric conversion elements that receive the plurality of rays of wavelength shift correction emission-line light when the wavelength shift correction light is measured as the incident light with the spectrometer to be subjected to wavelength shift correction, the reference wavelength shift correction emission-line light being set beforehand from the plurality of rays of wavelength shift correction emission-line light;

and a second step of determining a wavelength variation from a difference between the wavelength shift correction time emission-line wavelength determined in the first step and a known emission-line wavelength of the reference wavelength shift correction emission line light, and performing wavelength shift correction on the spectrometer to be subjected to wavelength shift correction. At least one of a plurality of photoelectric conversion elements that receives the plurality of rays of wavelength shift correction emission-line light receives a plurality of rays of wavelength shift correction emission-line light.

Such a wavelength shift correction method is hardly affected by emission line intervals, because at least one of the plurality of specific photoelectric conversion elements receives a plurality of rays of the plurality of rays of wavelength shift correction emission-line light.

This application is based on Japanese Patent Application No. 2017-159291, filed on Aug. 22, 2017, the contents of which are incorporated in this application.

While embodiments of the present invention have been illustrated and described in detail, these embodiments are merely illustrated examples and practical examples, and are not restrictive. The scope of the present invention should be construed in the language of the appended claims.

To express the present invention, the present invention has been appropriately and fully described above as embodiments with reference to the drawings. However, it should be understood that those skilled in the art can easily modify and/or improve the embodiments described above. Therefore, unless modifications or improvements implemented by those skilled in the art depart from the scope of the claims, the modifications or the improvements should be interpreted as inclusive in the scope of the claims.

INDUSTRIAL APPLICABILITY

According to the present invention, it is possible to provide a wavelength shift correction system and a wavelength shift correction method that correct wavelength shifts of a spectrometer.

The invention claimed is:

1. A wavelength shift correction system comprising:
   a wavelength shift correction light source that emits wavelength shift correction light including a plurality of rays of wavelength shift correction emission-line light;
   a spectrometer including a spectroscopic part that receives respective rays of dispersed spectral light obtained by dispersing incident light in accordance with wavelength with a plurality of photoelectric conversion elements arranged in a direction of dispersion, and outputs respective electrical signals corresponding to respective light intensities of the respective rays of dispersed spectral light, the spectrometer being a spectrometer to be subjected to wavelength shift correction; and
   a hardware processor that determines a wavelength shift correction time emission-line wavelength corresponding to reference wavelength shift correction emission-line light on a basis of respective electrical signals output from a plurality of specific photoelectric conversion elements that receive the plurality of rays of wavelength shift correction emission-line light in the plurality of photoelectric conversion elements when the wavelength shift correction light is measured as the incident light with the spectrometer to be subjected to wavelength shift correction, and determines a wavelength variation from a difference between the determined wavelength shift correction time emission-line wavelength and a known emission-line wavelength of the reference wavelength shift correction emission-line light, the reference wavelength shift correction emission-line light being set beforehand from the plurality of rays of wavelength shift correction emission-line light,
   wherein at least one of the plurality of specific photoelectric conversion elements receives a plurality of rays of the plurality of rays of wavelength shift correction emission-line light.

2. The wavelength shift correction system according to claim 1, further comprising:
   a table information storage unit that stores a table indicating, for respective wavelengths at predetermined wavelength intervals, correspondence relationship between a predetermined ratio in respective electrical signals and respective wavelengths of respective rays of emission-line light or one of the rays of emission-line light in a predetermined wavelength range including respective emission-line wavelengths of the plurality of rays of wavelength shift correction emission-line light, the respective electrical signals being output from the plurality of specific photoelectric conversion elements receiving the same number of rays of emission-line light as the plurality of rays of wavelength shift correction emission-line light, the respective electrical signals having the same wavelength intervals as respective emission-line wavelength intervals in the plurality of rays of wavelength shift correction emission-line light,
   wherein, when the wavelength shift correction light is measured as the incident light with the spectrometer to be subjected to wavelength shift correction, the hardware processor determines the predetermined ratio from the respective electrical signals output from the plurality of specific photoelectric conversion elements, and determines the wavelength shift correction time emission-line wavelength, from the determined predetermined ratio and the table stored in the table information storage.

3. The wavelength shift correction system according to claim 1, wherein
   the hardware processor performs wavelength shift correction on the spectrometer to be subjected to wavelength shift correction, on a basis of the determined wavelength variation.

4. The wavelength shift correction system according to claim 1, wherein
   the hardware processor issues a warning indicating that wavelength shift correction is necessary, on a basis of the determined wavelength variation.

5. The wavelength shift correction system according to claim 1, wherein
   the wavelength shift correction light source includes a neon lamp.

6. The wavelength shift correction system according to claim 1, wherein
   the wavelength shift correction light source is incorporated in the spectrometer to be subjected to wavelength shift correction.

7. The wavelength shift correction system according to claim 1, wherein
   the wavelength shift correction light source is independent of the spectrometer to be subjected to wavelength shift correction.

8. A wavelength shift correction method for performing wavelength shift correction on a spectrometer to be subjected to wavelength shift correction, involving: a wavelength shift correction light source that emits wavelength shift correction light including a plurality of rays of wavelength shift correction emission-line light; and a spectrometer including a spectroscopic part that receives respective rays of dispersed spectral light obtained by dispersing incident light in accordance with wavelength with a plurality of photoelectric conversion elements arranged in a direction of dispersion, and outputs respective electrical signals corresponding to respective light intensities of the respective rays of dispersed spectral light, the spectrometer being the spectrometer to be subjected to wavelength shift correction, the wavelength shift correction method comprising:

determining a wavelength shift correction time emission-line wavelength corresponding to reference wavelength shift correction emission-line light on a basis of respective electrical signals output from a plurality of photoelectric conversion elements that receive the plurality of rays of wavelength shift correction emission-line light when the wavelength shift correction light is measured as the incident light with the spectrometer to be subjected to wavelength shift correction, the reference wavelength shift correction emission-line light being set beforehand from the plurality of rays of wavelength shift correction emission-line light; and determining a wavelength variation from a difference between the determined wavelength shift correction time emission-line wavelength and a known emission-line wavelength of the reference wavelength shift correction emission line, wherein at least one of a plurality of photoelectric conversion elements that receive the plurality of rays of wavelength shift correction emission-line light receives a plurality of rays of wavelength shift correction emission-line light.

9. The wavelength shift correction system according to claim 2, wherein the hardware processor performs wavelength shift correction on the spectrometer to be subjected to wavelength shift correction, on a basis of the determined wavelength variation.

10. The wavelength shift correction system according to claim 2, wherein the hardware processor issues a warning indicating that wavelength shift correction is necessary, on a basis of the determined wavelength variation.

11. The wavelength shift correction system according to claim 2, wherein the wavelength shift correction light source includes a neon lamp.

12. The wavelength shift correction system according to claim 2, wherein the wavelength shift correction light source is incorporated in the spectrometer to be subjected to wavelength shift correction.

13. The wavelength shift correction system according to claim 2, wherein the wavelength shift correction light source is independent of the spectrometer to be subjected to wavelength shift correction.

14. The wavelength shift correction system according to claim 3, wherein the hardware processor issues a warning indicating that wavelength shift correction is necessary, on a basis of the determined wavelength variation.

15. The wavelength shift correction system according to claim 3, wherein the wavelength shift correction light source includes a neon lamp.

16. The wavelength shift correction system according to claim 3, wherein the wavelength shift correction light source is incorporated in the spectrometer to be subjected to wavelength shift correction.

17. The wavelength shift correction system according to claim 3, wherein the wavelength shift correction light source is independent of the spectrometer to be subjected to wavelength shift correction.

18. The wavelength shift correction system according to claim 4, wherein the wavelength shift correction light source includes a neon lamp.

19. The wavelength shift correction system according to claim 4, wherein the wavelength shift correction light source is incorporated in the spectrometer to be subjected to wavelength shift correction.

20. The wavelength shift correction system according to claim 4, wherein the wavelength shift correction light source is independent of the spectrometer to be subjected to wavelength shift correction.

* * * * *